United States Patent
Schlueter

(10) Patent No.: US 8,703,632 B2
(45) Date of Patent: Apr. 22, 2014

(54) BUILDING BOARD FOR USE AS A CARRIER FOR A SURFACE CLADDING OF CERAMIC TILES, A STUCCO, OR A TROWEL MORTAR, ON OR IN BUILDINGS

(75) Inventor: Werner Schlueter, Iserlohn (DE)

(73) Assignee: Schlueter-Systems KG, Iserlohn (DE)

( * ) Notice: Subject to any disclaimer, the term of this patent is extended or adjusted under 35 U.S.C. 154(b) by 49 days.

(21) Appl. No.: 12/284,939

(22) Filed: Sep. 26, 2008

(65) Prior Publication Data

US 2009/0035550 A1 Feb. 5, 2009

Related U.S. Application Data

(63) Continuation of application No. PCT/EP2007/052578, filed on Mar. 19, 2007.

(30) Foreign Application Priority Data

Apr. 7, 2006 (DE) .................. 20 2006 005 694

(51) Int. Cl.
*B32B 5/24* (2006.01)

(52) U.S. Cl.
USPC ............. 442/373; 442/85; 442/86; 442/221; 442/224; 442/225; 442/239; 442/246; 442/247; 442/268; 442/277; 442/278; 442/283; 442/286; 442/295; 442/370; 442/381; 442/391; 442/392; 442/412

(58) Field of Classification Search
USPC ............ 442/85, 86, 221, 224, 225, 239, 246, 442/247, 268, 277, 278, 283, 286, 295, 370, 442/373, 381, 391, 392, 412
See application file for complete search history.

(56) References Cited

U.S. PATENT DOCUMENTS

| | | | | |
|---|---|---|---|---|
| 2,928,456 A * | 3/1960 | Potchen et al. | ............... | 442/224 |
| 4,032,689 A * | 6/1977 | Johnson et al. | ................. | 428/55 |
| 4,042,746 A * | 8/1977 | Hofer | .......................... | 428/308.4 |
| 4,268,571 A * | 5/1981 | McCarthy | ...................... | 442/226 |
| 4,798,756 A * | 1/1989 | Fukushima et al. | .......... | 428/198 |
| 5,462,623 A * | 10/1995 | Day | .............................. | 156/250 |
| 6,941,720 B2 * | 9/2005 | DeFord et al. | ............. | 52/783.14 |
| 7,763,134 B1 * | 7/2010 | Kumar | ............................ | 156/39 |
| 2004/0140587 A1 * | 7/2004 | Hadley | .......................... | 264/257 |

FOREIGN PATENT DOCUMENTS

| | | |
|---|---|---|
| DE | 19 27 794 | 11/1965 |
| DE | 92 00 687 | 3/1992 |
| DE | 199 40 423 | 1/2002 |
| EP | 0 808 712 | 11/1997 |
| FR | 2 351 784 | 12/1977 |
| FR | 2 774 715 | 8/1999 |

OTHER PUBLICATIONS

Definition "material" http://www.merriam-webster.com/dictionary/material, Merriam Webster Inc, 2012 (no month).*
International Search Report.

* cited by examiner

*Primary Examiner* — Andrew Piziali
(74) *Attorney, Agent, or Firm* — Collard & Roe, P.C.

(57) ABSTRACT

Building board for use as a carrier for a surface cladding of ceramic tiles, a stucco, or a thin-layer trowel mortar, on or in buildings, in which on a moisture-resistant and moisture-sealed foam-material core layer, there is glued on both sides a water-resistant paper web or thin plastic web, onto which webs in each case a web of nonwoven fabric or of a knitted or loom-knitted woven fabric is glued.

24 Claims, 1 Drawing Sheet

Figure 1:
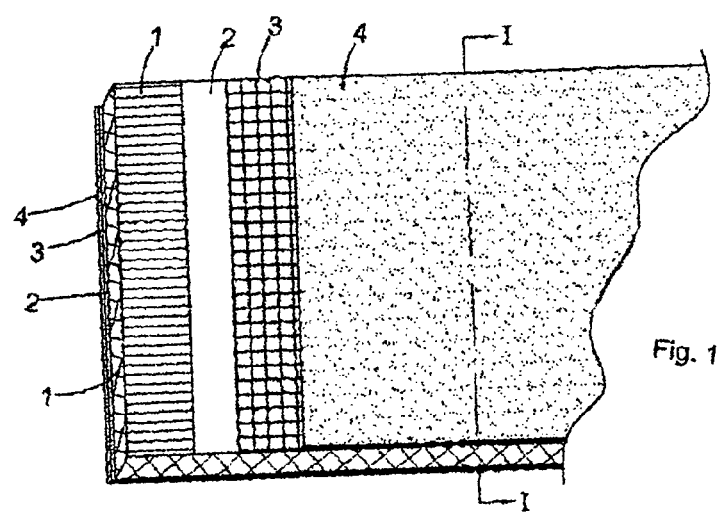

BUILDING BOARD FOR USE AS A CARRIER FOR A SURFACE CLADDING OF CERAMIC TILES, A STUCCO, OR A TROWEL MORTAR, ON OR IN BUILDINGS

CROSS REFERENCE TO RELATED APPLICATIONS

Applicant claims priority on and this application is a continuation under 35 U.S.C. §120 of International Application No. PCT/EP2007/052578 filed Mar. 19, 2007, which claims priority under 35 U.S.C. §119 of German Application No. 20 2006 005 694.7 filed Apr. 7, 2006. The international application under PCT article 21(2) was not published in English. Applicant also claims priority under 35 U.S.C. §119 of German Application No. 20 2006 005 694.7 filed Apr. 7, 2006.

Building boards for the stated use are known, in which a board of moisture-resistant foam material is coated on both sides with cement mortar and a coarse-mesh woven fabric lattice, to provide the necessary reinforcement.

Building boards are also known from DE 92 00 687.6 U1, in which the foam-material core layer consists of polyurethane, having a closed-cell outer skin, approximately having a thickness of 25 mm. A web of fiberglass nonwoven fabric is foamed in on the visible side of this foam-material core layer, whereby the foam material penetrates through the nonwoven fabric web.

A similar building board, as a sandwich component, is known from DE 19 27 794, in which a nonwoven fabric web is also foamed in onto the foam-material core layer. In this connection, another web of an air-permeable and water vapor-permeable material can be disposed between the cover layers of nonwoven fabric and the foam-material core layer, for example made of a mesh structure or a network, whereby this intermediate layer can be glued on.

An insulation panel, particularly for covering an outside wall of a building, or as a tile carrier in wet-cell construction, is also known from DE 199 40 423 C2; it has a panel-shaped insulation material layer of a foamed-on or cast insulation material, whereby a woven nonwoven fabric is foamed in or cast in at the surface, on one or both sides of this foam-material core layer, as a carrier material for an exterior stucco or a tile mortar, which material itself forms a cover layer.

Multi-layer laminates are known from FR 2 351 784, consisting of a stretchable plastic resin layer having a thermoplastic resin layer, which does not stretch or stretches only slightly, applied on both sides, which layer in turn is covered with a third layer, in each instance. In this connection, this third layer can consist of plastic, woven fabric or paper. The stretchable core layer can consist of foamed polystyrene. However, these are laminates that are not capable of support, such as those used for lining furniture, vehicles, etc.

All known building boards, which are used in the interior and exterior region of buildings, but preferably in moisture areas such as bathrooms or the like, are supposed to form a moisture-resistant substrate, capable of supporting, for the subsequent surface claddings, such as tiles, for example. They replace usual sheetrock panels, panels made of wood materials, or plaster coatings, which are not considered to be moisture-resistant. The disadvantage of such building boards, which are either cement-coated or also covered with nonwoven fabric, is that these distort or warp before being installed, particularly in the case of moisture impact from one side, and therefore make plane-parallel installation on walls impossible, in some instances.

The task of the invention consists in proposing building boards on the basis of foam-material boards, as moisture-resistant carriers for surface claddings on or in buildings, which do not demonstrate the disadvantage of distortion in the case of unintentional moisture impact, while having sufficient bending resistance.

By means of directly gluing paper webs or thin, non-stretchable plastic webs onto both sides of the foam-material core layer, the building board covered in such a manner becomes unchangeable in length even in case of unintentional moisture impact, since the glued-on water-resistant paper web or the non-stretchable plastic web cannot change in length. The board, therefore, cannot altogether distort or warp. Subsequently, a web of nonwoven fabric or a knitted or loom-knitted woven fabric is glued onto this foam-material core layer with the glued-on layer; this web then forms the suitable carrier, as an adhesion base for the adhesive of a surface cladding or ceramic tiles, a stucco, or a thin-layer trowel mortar. The building boards according to the invention are therefore also blocked from moisture impact with regard to their foam-material core layer. In particular, building boards having a low thickness, essentially below 50 mm, are reinforced to a particular degree.

Nonwoven fabrics are understood to be textile surface structures as interlaid scrims or individual fibers or threads. In contrast to this, woven fabrics, knitted fabrics, and loom-knitted fabrics are produced from regularly disposed threads or yarns. Felts are included among nonwoven fabrics.

In order to make the foam-material core layer that is used particularly moisture-resistant, it is preferred to use a closed-cell foam material. In the case of particular demands with regard to the bearing capacity and bending resistance, the foam-material core layer can consist of multiple layers glued and/or bonded to one another, which are preferably disposed crosswise to one another, in each instance.

In the following, the invention will be explained in greater detail using an exemplary embodiment that is shown. The figures show:

FIG. 1: in a schematic, perspective view, the structure of a building board and

Figure 2:
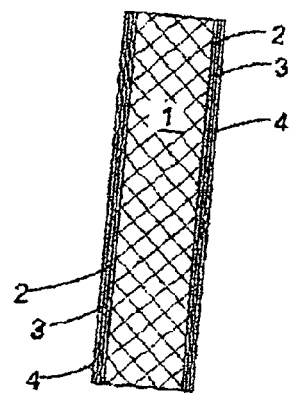

FIG. 2: a section along the line I-I in FIG. 1.

The core of the building board is formed by a moisture-resistant foam-material core-layer board 1, preferably of a polystyrene, having a closed-cell foam structure. A water-resistant paper sheet 2 or a non-stretchable plastic film is glued onto both sides of this foam-material core layer 1. Onto this, in turn, a web 3 of a lattice material or woven fabric material is applied. On this, a nonwoven fabric web 4 is glued on, using a suitable adhesive, or laminated on. All the webs 2, 3, and 4 reinforce the building board, and prevent changes in length and warping of the building board, which has a sandwich-like structure, when influences of moisture occur. In this connection, the adhesives that are used also do not change as the result of moisture influences, after they have hardened.

A building board according to the invention is also sufficiently bending-resistant for installation. It is furthermore sufficiently bending-resistant to bridge the free interstices when installed on a stud frame, for example for interior walls.

The invention claimed is:

1. A building board for use as a carrier for a surface cladding of ceramic tiles, a stucco, or a trowel mortar, on or in buildings, comprising:

a moisture-resistant foam-material core layer comprising at least two sides including a first side and a second side; and a first set of webs coupled to said first side comprising:
a first web comprising a paper sheet;
a second web coupled to said first web;

a third web coupled to said second web;
a second set of webs coupled to said second side comprising:
a fourth web comprising a paper sheet;
a fifth web coupled to said fourth web;
a sixth web coupled to said fifth web
wherein said first web comprises a material having a structure that is different in structure from said second web, and said third web, said second web comprises a material having a structure that is different in structure from said third web, said fourth web comprises a material having a structure that is different in structure from said fifth web and said sixth web, said fifth web comprises a material having a structure that is different in structure from said sixth web;
wherein said six webs and said foam material core layer combine to form the building board and wherein said third web and said sixth web each define an exterior surface of the building board, wherein said third web and said sixth web each are a non-woven fabric having a textile surface structure, said third web and said sixth web comprising material forming an adhesion base for the ceramic tiles, a stucco, or a trowel mortar.

2. The building board according to claim 1, wherein said third web and said sixth web are made of a same material.

3. The building board according to claim 1, wherein said foam-material core layer is moisture sealed.

4. The building board according to claim 1, wherein said-second web of fabric comprises a knitted fabric and said fifth web of fabric comprises a knitted fabric.

5. The building board according to claim 1, wherein said second web of fabric comprises a loom knitted fabric and wherein said fifth web of fabric comprises a loom knitted fabric.

6. The building board as in claim 1, wherein a first side of said at least two sides of said core layer is covered by said first web, and a second side of said at least two sides is covered by said fourth web, wherein said three webs of said first set of webs are configured to prevent distortion of said core layer.

7. The building board as in claim 1, wherein said moisture-resistant foam-material core layer comprises a closed cell foam material.

8. The building board as in claim 1, wherein said moisture-resistant foam material core layer comprises multiple layers, which are disposed crosswise to one another.

9. The building board as in claim 1, wherein said first web that is coupled to a first side of said at least two sides of said core layer is positioned directly opposite said fourth web coupled to a second side of said at least two sides of said core layer.

10. The building board as in claim 1, wherein said first web is disposed along an extension of said second web between said a moisture-resistant foam-material core layer, and said second web.

11. The building board as in claim 1, wherein said second web of fabric is glued onto each of said first web.

12. The building board as in claim 1, wherein said first web is a water resistant paper sheet.

13. A building board for use as a carrier for a surface cladding of ceramic tiles, a stucco, or a trowel mortar, on or in buildings, comprising:
a moisture-resistant foam-material core layer comprising at least two sides including a first side and a second side; and
a first set of webs coupled to said first side, said first set of webs comprising:
three webs, each of a different structure comprising:
a first web comprising a non-stretchable plastic film coupled to one side of said at least two sides of said moisture-resistant foam-material core layer;
a second web coupled to said first web; and
a third web which is coupled to said second web defining an exterior surface of the building board, said third web comprising material forming an adhesion base for the ceramic tiles, a stucco, or a trowel mortar
a second set of webs comprising:
three webs each of a different structure comprising:
a fourth web comprising non-stretchable plastic film coupled to another side of said at least two sides of said moisture-resistant foam material core layer;
a fifth web coupled to said fourth web;
a sixth web which is coupled to said fifth web, wherein said six webs and said foam material core layer combine to form the building board wherein said third web and said sixth web each are a non-woven fabric having a textile surface structure.

14. The building board according to claim 13 wherein said second web comprises a lattice material that is disposed between said first web and said third web.

15. The building board according to claim 13, wherein said foam-material core layer is moisture sealed.

16. The building board according to claim 13, wherein said second web of fabric comprises a knitted fabric.

17. The building board according to claim 13, wherein said-second web of fabric comprises a loom knitted fabric.

18. The building board as in claim 13, wherein said first web is configured to prevent distortion of said core layer.

19. The building board as in claim 13, wherein said moisture-resistant foam-material core layer comprises a closed cell foam material.

20. The building board as in claim 13, wherein said moisture-resistant foam material core layer comprises multiple layers, which are disposed crosswise to one another.

21. The building board as in claim 13, wherein said first web that is coupled to a first side of said at least two sides of said core layer is positioned directly opposite said first web coupled to a second side of said at least two sides of said core layer.

22. The building board as in claim 13, wherein said first web is disposed along an extension of said second web between said a moisture-resistant foam-material core layer, and said second web.

23. The building board as in claim 13, wherein said second web of fabric is glued onto each of said first web.

24. The building board as in claim 13, wherein said first web is a water resistant paper sheet.

* * * * *